United States Patent
Li et al.

(10) Patent No.: US 10,454,366 B1
(45) Date of Patent: Oct. 22, 2019

(54) CURRENT SENSORLESS CONTROL METHOD FOR DAB-BASED SINGLE STAGE ISOLATED PFC CONVERTERS

(71) Applicant: Shanghai Jiao Tong University, Shanghai (CN)

(72) Inventors: Guojie Li, Shanghai (CN); Anping Tong, Shanghai (CN); Lijun Hang, Shanghai (CN); Jingzhou Xu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 16/240,695

(22) Filed: Jan. 4, 2019

(30) Foreign Application Priority Data

Sep. 19, 2018 (CN) .......................... 2018 1 1091714

(51) Int. Cl.
*H02M 1/42* (2007.01)
*H02M 7/219* (2006.01)

(52) U.S. Cl.
CPC ......... *H02M 1/4233* (2013.01); *H02M 1/425* (2013.01); *H02M 7/219* (2013.01)

(58) Field of Classification Search
CPC ............ H02M 1/20; H02M 1/22; H02M 1/30; H02M 1/32; H02M 1/4208; H02M 1/4233; H02M 1/425; H02M 7/006; H02M 7/217; H02M 7/219; H02M 7/7575; H02M 2001/0032; Y02B 70/126; Y02B 70/1475

USPC ................ 363/73, 75, 89, 90, 108, 123, 127
See application file for complete search history.

(56) References Cited

U.S. PATENT DOCUMENTS

| | | | | |
|---|---|---|---|---|
| 7,262,979 B2* | 8/2007 | Wai | ........................ | H02M 1/34 363/56.03 |
| 8,730,696 B2* | 5/2014 | Barbosa | ................ | H02M 7/483 363/71 |
| 9,112,422 B1* | 8/2015 | Vinciarelli | ........ | H02M 3/33507 |
| 9,231,487 B2* | 1/2016 | Suzuki | .................... | H02M 1/36 |
| 9,893,633 B1* | 2/2018 | Li | ..................... | H02M 3/33546 |

* cited by examiner

*Primary Examiner* — Yemane Mehari
(74) *Attorney, Agent, or Firm* — Mei & Mark LLP; Manni Li

(57) ABSTRACT

A current sensorless control system and a control method thereof for single stage isolated PFC converters based on DAB. By coordinating three control variables of the DAB converter, that is, the inside phase-shifting ratio of the primary side full-bridge, the inside phase-shifting ratio of the secondary side full-bridge, and the phase-shifting ratio between the primary and the secondary sides, the present invention does not need to design additional current controller for the control of the input current, and may make the input current sinusoidal by directly coordinating the output voltage controller, the input voltage and the current modulation step, thereby reducing system cost and the difficulty of controller design, enhancing the stability of the control system, and improving the dynamic performance.

2 Claims, 4 Drawing Sheets current sensorless control system

CURRENT SENSORLESS CONTROL METHOD FOR DAB-BASED SINGLE STAGE ISOLATED PFC CONVERTERS

CROSS-REFERENCE TO RELATED APPLICATION

The subject application claims priority on Chinese patent application CN201811091714.2 filed on Sep. 19, 2018 in China. The contents and subject matter of the Chinese priority application is incorporated herein by reference.

FIELD OF TECHNOLOGY

The present invention relates to power conversion, particularly, a current sensorless control method for dual active bridge converter (DAB) based single-stage isolated PFC converters.

BACKGROUND ART

With the development of the power electronics technology, high-frequency isolated power conversion is more and more applied to the power grid, becoming an important means to realize fast and flexible control in the power grid. However, the wide application of power electronic devices in AC/DC applications leads to an increase in the harmonic content of the grid current and seriously threatens the normal operation of the power grid. In order to reduce the harmonic pollution caused by power electronic devices and improve the power quality of the power grid, the International Electrotechnical Commission has issued and revised the harmonic standards such as IEC61000-3-2 and IEC555-2, and made uniform and clear regulations on the harmonic standards that various types of electrical equipment need to meet. Power Factor Correction (PFC) may reduce input current distortion of electrical equipments, improve input power factor, and reduce the harmonic pollution of converters to the power grid. It has become a necessary technical means for various electrical equipments to meet relevant harmonic standards. The AC/DC converter using PFC technology is called a PFC converter, which may realize the sinusoidal control of the input current waveform and make the phase of the input current waveform the same as the phase of the input voltage, and has excellent suppression effect on the input harmonic current, thus obtaining a wide range of applications and concerns.

The AC/DC converter may be classified into an isolated type and a non-isolated type depending on whether or not a transformer is used for isolation in the converter. In many applications, isolated AC/DC converters are required for safety and for the match of input voltages with output voltages. The Isolated AC/DC converter may be classified into single-stage and two-stage depending on the form of power change. The single-stage isolated AC/DC converter omits the first stage converter and directly performs energy conversion, which reduces the complexity of the circuit and improves the system efficiency.

The Dual Active Bridge-Isolated Bidirectional DC/DC Converter (hereinafter referred to as a DAB converter) based on phase shift modulation scheme (PSMS) has advantages of high power density, fast dynamic response, easy realization of soft switching, electrical isolation of primary and secondary sides, bidirectional flow of power, and the like, and is popular in applications such as uninterruptible power supply, electric vehicles, solid state transformers, and the like. The DAB-based single-stage isolated PFC converter achieves the purpose of improving power factor and reducing harmonic distortion by reasonably controlling the DAB converter to make its input current sinusoidal. Usually, it is necessary to add an inner current loop controller to control the input current. However, the inner current loop reduces the bandwidth of the system and increases the difficulty of the control system design. Therefore, how to properly control the DAB converter to make the input current sinusoidal, so as to achieve direct control of the input current, becomes a major challenge for the new generation of isolated PFC converters in the field of high frequency and high power density.

SUMMARY OF THE INVENTION

In view of the forgoing, the present invention provides a current sensorless control system and a control method thereof for single stage isolated PFC converters based on DAB, which may realize direct control of input current without requiring closed loop of input current, significantly reduces the cost of the control system and the complexity of the implementation, improves the dynamic performance of converters and facilitates the sinusoidalization of the input current.

In order to achieve the above object, the technical solution of the present invention is as follows:

To solve the above problems, the present invention provides a current sensorless control system and a control method thereof for DAB-based single-stage isolated PFC converter, which may realize direct control of input current without requiring closed loop of input current, and significantly reduces the control system. The cost and implementation complexity improve the dynamic performance of the converter and is more conducive to the sinusoidalization of the input current.

The present invention provides a current sensorless control system for DAB-based single stage isolated PFC converters, the system includes a diode rectifier circuit, a DAB converter power main circuit, an EMI filter, and a controller.

In the system of the present invention, the diode rectifier circuit comprises a full rectified bridge composed of four diodes $D_1$~$D_4$ and an input AC voltage source $u_{in}$.

The DAB converter power main circuit is composed of an input filter capacitor $C_i$, an output filter capacitor $C_o$, a primary single-phase full-bridge $H_1$, a secondary single-phase full-bridge $H_2$, a high frequency isolating transformer, a high frequency inductor L, and a controller. The four fully controlled switching devices of the primary single-phase full-bridge $H_1$ are $S_1$~$S_4$, and the four fully controlled switching devices of the secondary single-phase full-bridge $H_2$ are $Q_1$~$Q_4$. The anode of the DC bus of the primary single-phase full-bridge $H_1$ is connected to the anode of the input filter capacitor $C_i$, and the cathode of the DC bus of the primary single-phase full-bridge $H_1$ is connected to the cathode of the input filter capacitor $C_i$, and the AC side of the single-phase full-bridge $H_1$ is connected to the primary side of the high frequency isolating transformer through the high frequency inductor L. The anode of the DC bus of the secondary single-phase full-bridge $H_2$ is connected to the anode of the output filter capacitor $C_o$, and the cathode of the DC bus of the secondary single-phase full-bridge $H_2$ is connected to the cathode of the output filter capacitor $C_o$, the AC side of the secondary single-phase full-bridge $H_2$ is connected to the secondary side of the high frequency isolating transformer, and the ratio of the high frequency isolating transformer is N:1. The input port of the control signal of the primary side single-phase full-bridge switching device $S_1$~$S_4$ and the input port of the control signal of the secondary side single-phase full-bridge switching device $Q_1$~$Q_4$ are connected to the output port of the corresponding switching signal of the controller.

The EMI filter includes a filter inductor $L_{di}$, a filter inductor $L_{fi}$ and a damping resistance $R_{di}$: The filter inductor $L_{di}$ is connected in series with the filter inductor $L_{fi}$, the damping resistance $R_{di}$ is connected in parallel with the filter inductor $L_{di}$; and the cathode of the DC bus of the diode rectifier circuit is connected to the cathode of the input filter capacitor $C_i$. The filter inductor $L_{fi}$ is connected to the anode of the input filter capacitor $C_i$; and the anode of the DC bus of the diode rectifier circuit is connected to the filter inductor $L_{di}$.

Further, in the present invention, the controller adopts digital control mode, including an A/D sampling step, a PI controller, a double frequency pulsating digital filtering step, and a modulation unit; the A/D sampling step has two signal input ports, and the input voltage $u_{in}$ of the PFC converter and the bus output voltage $v_{out}$ are sampled and analog/digital converted from analog signal to digital signal in this step. The double frequency pulsating digital filtering step is a second-order band rejection filter for filtering the double frequency pulsation included in the output voltage $v_{out}$ output by the PI controller; the modulation unit modulates the output x of the PI controller into a switch control signal after amplitude limiting, and the output port thereof is respectively connected to the input port of the control signal corresponding to the switching devices $S_1$ to $S_4$ and $Q_1$ to $Q_4$ corresponding to the primary and secondary full-bridges of the DAB.

The control method using the above current sensorless control system for the DAB-based single stage isolated PFC converters of the present invention comprises the following steps:

(1) Sampling the input AC voltage of the main power circuit, converting it into a digital signal and obtaining the absolute value $|u_{in}|[n]$;

(2) sampling the output voltage of the main power circuit, converting it into a digital signal, and filtering the double frequency pulsation to obtain the output voltage $V_{out, avg}[n]$;

(3) the controller calculates the output of the PI controller $V_{ev}[n]$ according to formula (3):

$$V_{ev}[n] = k_p(V_{ref} - V_{out,avg}[n]) + k_i \sum_{j=1}^{n}(V_{ref} - V_{out,avg}[n]), \quad (3)$$

wherein $V_{ref}$ is the reference value of the converter output voltage, $k_p$ is the proportion coefficient of the PI controller, and $k_i$ is the integral coefficient of the PI controller. The values of these two parameters are preset, and the preset range is $0.1 \leq k_p \leq 10$, $0.001 \leq k_i \leq 1$;

(4) multiply the output of the PI controller by $|uin|[n]$, set the assignment limit to [0, 1/9], and square the calculation result to get the control signal x:

$$x = \sqrt{V_{ev}[n] \times \frac{|u_{in}|[n]}{k_u}} \quad (4)$$

wherein $k_u$ is the proportion coefficient of $|uin|[n]$, which is preset and may be the peak value of the input voltage of the converter;

(5) the control signal x is modulated into phase-shifting ratio as follows:

$D_1 = D_2 = 1 - 2x$ $D_0 = x$, the modulation unit generates control signals of each of the switching devices $S_1$ to $S_4$ inside the primary side full-bridge and the switching devices $Q_1$ to $Q_4$ inside the secondary side full-bridge according to the phase-shifting ratio x between the primary and the secondary sides: the control signals of the primary side full-bridge internal switching devices $S_1$~$S_4$ and the control signals of the secondary side full-bridge internal switching devices $Q_1$~$Q_4$ are square waves with a duty cycle of 0.5; the phase-shifting ratio of the control signals of the switching devices $S_1$ and $S_4$ is D1, the control signals of the switching devices $S_2$ and $S_3$ are the same and complementary to the control signals of the switching devices $S_1$ and $S_4$;

the phase-shifting ratio of the control signals of the switching devices $Q_1$ and $Q_4$ is D2, the control signals of the switching devices $Q_2$ and $Q_3$ are the same and complementary to the control signals of the switching devices $Q_1$ and $Q_4$;

x is the phase-shifting ratio between the control signal $S_1$ and the control signal $Q_1$;

the control signal is respectively input to the control port of the switching devices of the primary side single-phase full-bridge and the secondary single-phase full-bridge, and the control process is completed.

Compared with the prior art, the present invention is advantageous in that:

To make the input current sinusoidal, the traditional PFC converter requires an inner current loop controller to control the input current so that the input current tracks a sinusoidal reference signal. However, in the above-mentioned closed loop regulation process, the inner loop controller has limitations of delay and bandwidth, and current sampling is needed, therefore increasing the cost and design complexity of the system and limiting the response time of the control system. The present invention controls the input current without designing additional controller, and may directly make the input current sinusoidal through the signal of the voltage outer loop, thereby reducing the cost of the system and improving the stability and rapidity of the control system.

The DAB-based single-stage isolated PFC converter achieves the purpose of improving power factor and reducing harmonic distortion by reasonably controlling the DAB converter to make its input current sinusoidal. It is usually necessary to add an inner current loop controller to control the input current. However, the inner current loop reduces the bandwidth of the system and increases the difficulty of the control system design. Therefore, how to properly control the DAB converter to make the input current sinusoidal, so as to achieve direct control of the input current, becomes a major challenge for the new generation of isolated PFC converters in the field of high frequency and high power density.

DETAILED DESCRIPTIONS OF THE INVENTION AND EMBODIMENTS

In combination with embodiments and figures, the present invention is further expounded. The embodiments and figures are not meant to limit the scope of the present invention.

Figure 1:
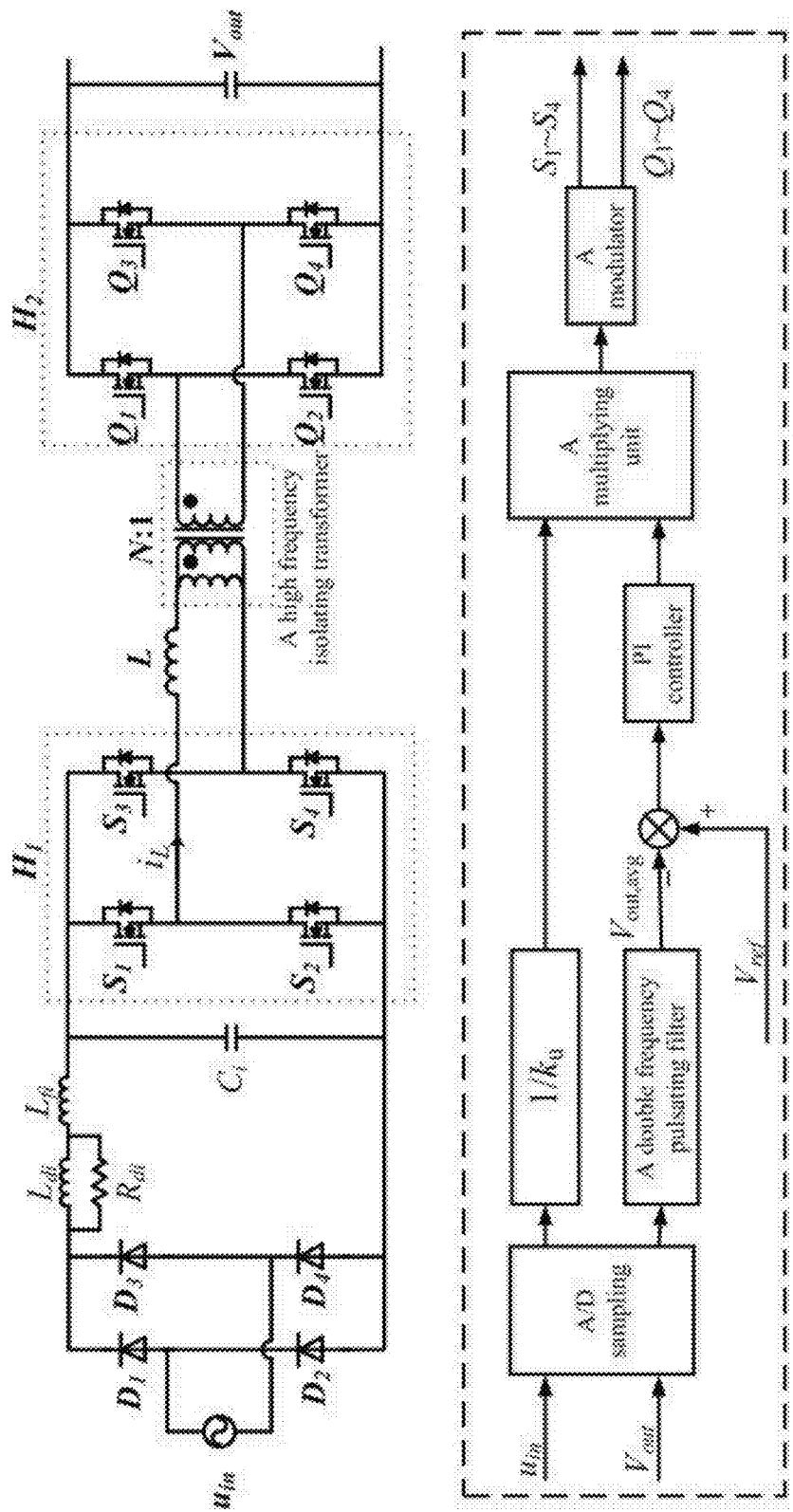
FIG. 1 is a structure diagram showing the current sensorless control system for the DAB-based single stage isolated PFC converters of the present invention.

As shown in FIG. 1, the control system comprises an A/D sampling module, a double frequency pulsating digital filter, a PI controller, and a modulator unit. Each module is loaded into a digital signal processor (DSP) chip in the form of a software, and the DSP chip may be a TMS320F28335 chip. The control system of the present invention also forms a closed loop system by connecting the drive module to the main power circuit of the PFC converter. The main power circuit of the PFC converter includes a diode rectifier circuit, a DAB converter main power circuit, an EMI filter and a control system.

The control system of the present invention includes a diode rectifier circuit, a DAB converter power main circuit, an EMI filter, and a controller.

The diode rectifier circuit comprises a full rectified bridge composed of four diodes $D_1 \sim D_4$ and an input AC voltage source $u_{in}$.

The DAB converter power main circuit is composed of an input filter capacitor $C_i$, an output filter capacitor $C_o$, a primary single-phase full-bridge $H_1$, a secondary single-phase full-bridge $H_2$, a high frequency isolating transformer, a high frequency inductor L, and a controller. The four fully controlled switching devices of the primary single-phase full-bridge $H_1$ are $S_1 \sim S_4$, and the four fully controlled switching devices of the secondary single-phase full-bridge $H_2$ are $Q_1 \sim Q_4$. The anode of the DC bus of the primary single-phase full-bridge $H_1$ is connected to the anode of the input filter capacitor $C_i$, and the cathode of the DC bus of the primary single-phase full-bridge $H_1$ is connected to the cathode of the input filter capacitor $C_i$, and the AC side of the single-phase full-bridge $H_1$ is connected to the primary side of the high frequency isolating transformer through the high frequency inductor L. The anode of the DC bus of the secondary single-phase full-bridge $H_2$ is connected to the anode of the output filter capacitor $C_o$, and the cathode of the DC bus of the secondary single-phase full-bridge $H_2$ is connected to the cathode of the output filter capacitor $C_o$, the AC side of the secondary single-phase full-bridge $H_2$ is connected to the secondary side of the high frequency isolating transformer, and the ratio of the high frequency isolating transformer is N:1. The input port of the control signal of the primary side single-phase full-bridge switching device $S_1 \sim S_4$ and the input port of the control signal of the secondary side single-phase full-bridge switching device $Q_1 \sim Q_4$ are connected to the output port of the corresponding switching signal of the controller.

The EMI filter includes a filter inductor $L_{di}$, a filter inductor $L_{fi}$ and a damping resistance $R_{di}$. The filter inductor $L_{di}$ is connected in series with the filter inductor $L_{fi}$, the damping resistance $R_{di}$ is connected in parallel with the filter inductor $L_{di}$; and the cathode of the DC bus of the diode rectifier circuit is connected to the cathode of the input filter capacitor $C_1$. The filter inductor $L_{fi}$ is connected to the anode of the input filter capacitor $C_i$; the anode of the DC bus of the diode rectifier circuit is connected to the filter inductor $L_{di}$.

The controller adopts digital control mode, including an A/D sampling step, a PI controller, a double frequency pulsating digital filtering step and a modulation unit. The A/D sampling step has two signal input ports, and the input voltage $u_{in}$ of the PFC converter and the bus output voltage $v_{out}$ are sampled and analog/digital converted from analog signal to digital signal in this step. The double frequency pulsating digital filtering step is a second-order band rejection filter for filtering the double frequency pulsation included in the output voltage $v_{out}$; output by the PI controller; the modulation unit modulates the output x of the PI controller into a switch control signal after amplitude limiting, and the output port thereof is respectively connected to the input port of the control signal corresponding to the switching devices $S_1$ to $S_4$ and $Q_1$ to $Q_4$ corresponding to the primary and secondary full-bridges of the DAB.

The control method of the above current sensorless control system for single stage isolated PFC converters based on DAB, comprising the following steps:

(1) The A/D sampling step samples the input AC voltage of the main power circuit, converts it into a digital signal and obtains the absolute value |uin|[n];

(2) The A/D sampling step samples the output voltage of the main power circuit, converts it into a digital signal, and filters the double frequency pulsation to obtain the output voltage $V_{out,\,avg}[n]$;

(3) The controller calculates the output of the PI controller $V_{ev}[n]$ according to formula (1):

$$V_{ev}[n] = k_p(V_{ref} - V_{out,avg}[n]) + k_i \sum_{j=1}^{n}(V_{ref} - V_{out,avg}[n]) \quad (1)$$

where $V_{ref}$ is the reference value of the converter output voltage, $k_p$ is the proportion coefficient of the PI controller, and $k_i$ is the integral coefficient of the PI controller. The values of these two parameters are preset, and the preset range is $0.1 \leq k_p \leq 10$, $0.001 \leq k_i \leq 1$;

(4) Multiply the output of the PI controller by |uin|[n], set the assignment limit to [0, 1/9], and square the calculation result to get the control signal x:

$$x = \sqrt{V_{ev}[n] \times \frac{|u_{in}|[n]}{k_u}} \quad (2)$$

where $k_u$ is the proportion coefficient of |uin|[n], which is preset and may be the peak value of the input voltage of the converter;

(5) The control signal x is modulated into phase-shifting ratio as follows:

$D_1=D_2=1-2x$ $D_0=x$, the modulation unit generates control signals of each of the switching devices $S_1$ to $S_4$ inside the primary side full-bridge and the switching devices $Q_1$ to $Q_4$ inside the secondary side full-bridge according to the phase-shifting ratio x between the primary and the secondary sides. The control signals of the primary side full-bridge internal switching devices $S_1 \sim S_4$ and the control signals of the secondary side full-bridge internal switching devices $Q_1 \sim Q_4$ are square waves with a duty cycle of 0.5. The phase-shifting ratio of the control signals of the switching devices $S_1$ and $S_4$ is D1, the control signals of the switching devices $S_2$ and $S_3$ are the same and complementary to the control signals of the switching devices $S_1$ and $S_4$. The phase-shifting ratio of the control signals of the switching devices $Q_1$ and $Q_4$ is D2, the control signals of the switching devices $Q_2$ and $Q_3$ are the same and complementary to the control signals of the switching devices $Q_1$ and $Q_4$; x is the phase-shifting ratio between the control signal $S_1$ and the control signal $Q_1$; the control signal is respectively input to the control port of the switching devices of the primary side single-phase full-bridge and the secondary single-phase full-bridge, and the control process is completed.

Figure 2:
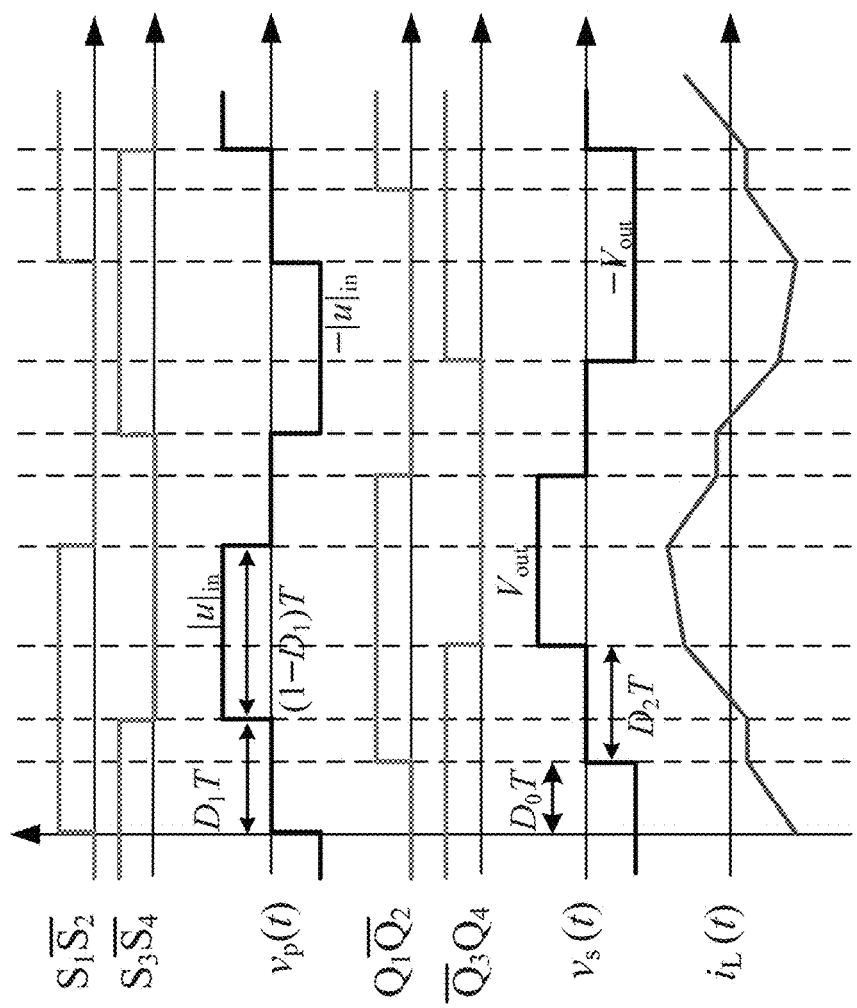
FIG. 2 is a schematic diagram showing the DAB modulation step in the control method of the present invention.

As shown in FIG. 2, the principle of the modulation unit is illustrated. The modulation unit generates control signals of each of the switching devices $S_1$ to $S_4$ inside the primary side full-bridge and the switching devices $Q_1$ to $Q_4$ inside the secondary side full-bridge according to the phase-shifting ratio x between the primary and the secondary sides: the control signals of the primary side full-bridge internal switching devices $S_1$~$S_4$ and the control signals of the secondary side full-bridge internal switching devices $Q_1$~$Q_4$ are square waves with a duty cycle of 0.5; The phase-shifting ratio of the control signals of the switching devices $S_1$ and $S_4$ is D1, the control signals of the switching devices $S_2$ and $S_3$ are respectively complementary to the control signals of the switching devices $S_1$ and $S_4$; The phase-shifting ratio of the control signals of the switching devices $Q_1$ and $Q_4$ is D2, the control signals of the switching devices $Q_2$ and $Q_3$ are complementary to the control signals of the switching devices $Q_1$ and $Q_4$; x is the phase-shifting ratio between the control signal $S_1$ and the control signal $Q_1$; the control signal is input to the control port of the switching devices of the primary side single-phase full-bridge and the secondary single-phase full-bridge. Therefore the control process is completed, and direct control of the input current is realized.

Figure 3:
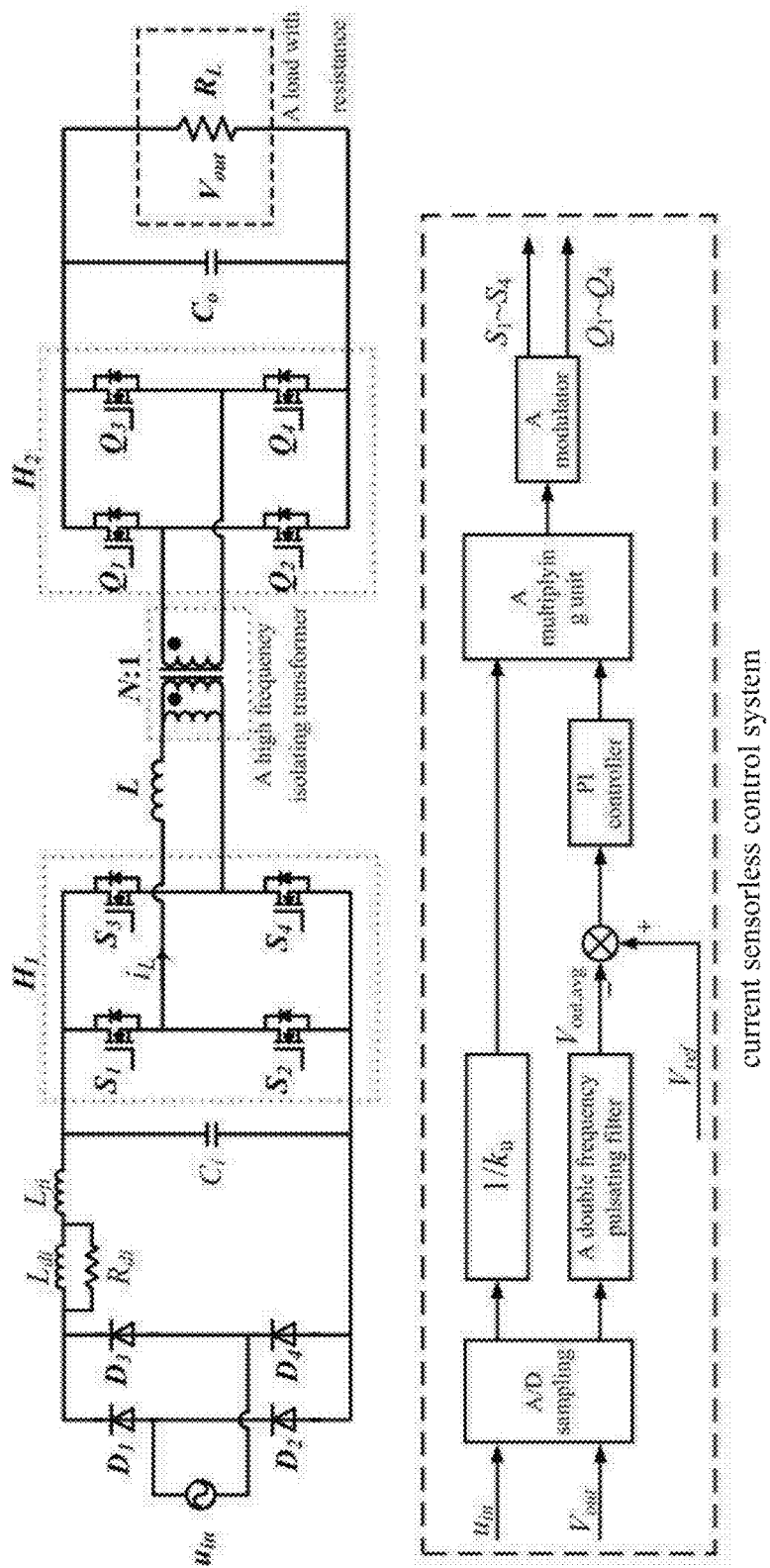
FIG. 3 is a structure diagram showing one embodiment of the current sensorless control system of the present invention.

In one embodiment of the present invention as shown in FIG. 3, main parameters of the control system of the present invention are as follows: Input voltage $u_{in}=220\sqrt{2}\sin(100\pi t)$; Output reference voltage $V_{ref}=400V$; Switching frequency $f_s=50$ kHz; Inductor $L=40$ uH; Transformer turns ratio N:1=0.59:1; EMI filter parameters $L_{di}=50$ uH; $L_{fi}=50$ uH; $R_{di}=5\Omega$; $C_i=7$ uF; $C_o=1$ mF; and Load with resistance.

Figure 4:
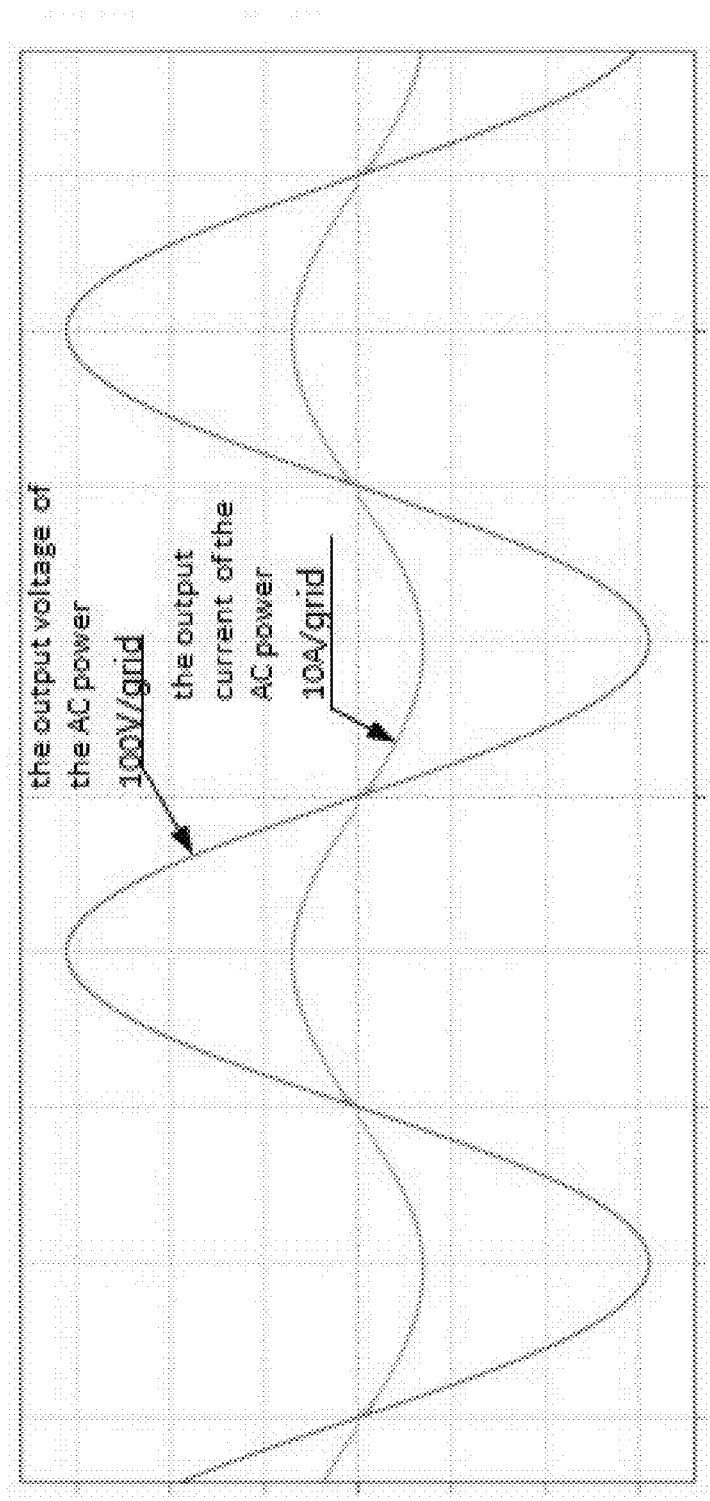
FIG. 4 is a waveform diagram showing the output voltage and current of the PFC converter after the control method of the present invention is employed.

FIG. 4 shows the waveform diagram of the output voltage and current of the AC power. As shown in FIG. 4, the current sensorless control method of the present invention is employed to make the output current waveform of the power track the voltage waveform, thereby realizing power factor correction. At this time, the power factor PF of the converter is 0.995, and the input current THD is 2.5%.

We claim:

1. A current sensorless control system for DAB-based single stage isolated PFC converters, comprising
a diode rectifier circuit, the diode rectifier circuit further comprising
a full rectified bridge having four diodes $D_1$, $D_2$, $D_3$, and $D_4$,
a DC bus having an anode and a cathode, and
an input AC voltage source $u_{in}$;
a DAB converter power main circuit, the DAB converter power main circuit further comprising
an input filter capacitor $C_i$ having an anode and a cathode,
an output filter capacitor $C_o$ having an anode and a cathode,
a primary single-phase full-bridge $H_1$, the primary single-phase full-bridge $H_1$ having 4 fully controlled switching devices, $S_1$, $S_2$, $S_3$, and $S_4$, an AC side, and a DC bus with an anode and a cathode, and each of the fully controlled switching devices, $S_1$, $S_2$, $S_3$, and $S_4$ having a input port for control signal,
a secondary single-phase full-bridge $H_2$, the secondary single-phase full-bridge $H_2$ having 4 fully controlled switching devices, $Q_1$, $Q_2$, $Q_3$, and $Q_4$, an AC side, and a DC bus with an anode and a cathode, and each of the fully controlled switching devices, $Q_1$, $Q_2$, $Q_3$, and $Q_4$ having a input port for control signal,
a high frequency isolating transformer having a primary side and a secondary side,
a high frequency inductor L, and
a controller having output ports for switching signal that correspond to the input ports for control signal of the switching devices $S_1$, $S_2$, $S_3$, and $S_4$ of the primary single-phase full-bridge $H_1$ and the input ports for control signal of the switching devices $Q_1$, $Q_2$, $Q_3$, and $Q_4$ of the secondary single-phase full-bridge $H_2$, respectively, and
an EMI filter, the EMI filter further comprising
a filter inductor $L_{di}$,
a filter inductor $L_{fi}$, and
a damping resistance $R_{di}$;
wherein the controller comprises
an A/D sampling step having two signal input ports for sampling an input voltage $u_{in}$ of a PFC converter and an output voltage $v_{out}$ of a bus, respectively,
a PI controller,
a double frequency pulsating digital filtering step being a second-order band rejection filter, and
a modulation unit having output ports corresponding to the input ports of the for control signal of the switching devices $S_1$, $S_2$, $S_3$, and $S_4$ of the primary single-phase full-bridge $H_1$ and the input ports for control signal of the switching devices $Q_1$, $Q_2$, $Q_3$, and $Q_4$ of the secondary single-phase full-bridge $H_2$, respectively;
the anode of the DC bus of the primary single-phase full-bridge $H_1$ is connected to the anode of the input filter capacitor $C_i$, the cathode of the DC bus of the primary single-phase full-bridge $H_1$ is connected to the cathode of the input filter capacitor $C_i$, and the AC side of the primary single-phase full-bridge $H_1$ is connected to the primary side of the high frequency isolating transformer through the high frequency inductor L;
the anode of the DC bus of the secondary single-phase full-bridge $H_2$ is connected to the anode of the output filter capacitor $C_o$, the cathode of the DC bus of the secondary single-phase full-bridge $H_2$ is connected to the cathode of the output filter capacitor $C_o$, the AC side of the secondary single-phase full-bridge $H_2$ is connected to the secondary side of the high frequency isolating transformer, and a ratio of the high frequency isolating transformer is N:1;
the input ports for control signal of the switching devices $S_1$, $S_2$, $S_3$, and $S_4$ of the primary single-phase full-bridge $H_1$ and the input ports for control signal of the switching devices $Q_1$, $Q_2$, $Q_3$, and $Q_4$ of the secondary single-phase full-bridge $H_2$ are connected to the corresponding output ports for switching signal of the controller, respectively;
the filter inductor $L_{di}$ is connected in series with the filter inductor $L_{fi}$, the damping resistance $R_{di}$ is connected in parallel with the filter inductor $L_{di}$ in the EMI filter;
the cathode of the DC bus of the diode rectifier circuit is connected to the cathode of the input filter capacitor $C_i$, the filter inductor $L_{fi}$ is connected to the anode of the input filter capacitor $C_i$, the anode of the DC bus of the diode rectifier circuit is connected to the filter inductor $L_{di}$; and the controller adopts a digital control mode, the A/D sampling step samples an input voltage $u_{in}$ of a PFC converter and an output voltage $v_{out}$ of the bus and converts an analog signal to a digital signal, a double frequency pulsation included in the output voltage $v_{out}$ is filtered by the second-order band rejection filter and sent by the PI controller as an output x; and the modulation unit modulates the output x of the PI controller into a switch control signal after amplitude limiting.

2. A control method using the current sensorless control system for DAB-based single stage isolated PFC converters of claim 1, comprising
   (1) sampling an input AC voltage of a main power circuit and converting the input AC voltage into a digital signal and obtaining a absolute value |uin|[n] by the A/D sampling step;
   (2) sampling an output voltage of the main power circuit and converting the output voltage into a digital signal by the A/D sampling step, and filtering the double frequency pulsation to obtain the output voltage $V_{out,avg}[n]$;
   (3) calculating by the controller an output of the PI controller $V_{ev}[n]$ according to formula (1);

$$V_{ev}[n] = k_p(V_{ref} - V_{out,avg}[n]) + k_i \sum_{j=1}^{n} (V_{ref} - V_{out,avg}[n]) \quad (1)$$

wherein $V_{ref}$ is a reference value for output voltage of the converter, $k_p$ is a proportion coefficient of the PI controller, and $k_i$ is an integral coefficient of the PI controller, values of $k_p$ and $k_i$ are preset and in a range of $0.1 \le k_p \le 10$ and $0.001 \le k_i \le 1$;
   (4) multiplying the output $V_{ev}[n]$ of the PI controller by |uin|[n], setting an assignment limit to [0, 1/9], and squaring a calculation result to get a control signal x:

$$x = \sqrt{V_{ev}[n] \times \frac{|u_{in}|[n]}{k_u}} \quad (2)$$

wherein $k_u$ is a proportion coefficient of |uin|[n] that is preset and a peak value of the input voltage of the converter;
   (5) modulating the control signal x into a phase-shifting ratio as follows:

$$D_1 = D_2 = 1 - 2x \; D_0 = x,$$

generating control signals of each of the switching devices $S_1$, $S_2$, $S_3$, and $S_4$ inside the primary single-phase full-bridge $H_1$ and the switching devices $Q_1$ to $Q_4$ inside the secondary single-phase full-bridge $H_2$ by the modulation unit according to the phase-shifting ratio x between the primary and the secondary sides, wherein the control signals for the switching devices are square waves with a duty cycle of 0.5; the phase-shifting ratio of the control signals of the switching devices $S_1$ and $S_4$ is D1, the control signals of the switching devices $S_2$ and $S_3$ are the same and complementary to the control signals of the switching devices $S_1$ and $S_4$; the phase-shifting ratio of the control signals of the switching devices $Q_1$ and $Q_4$ is D2, and the control signals of the switching devices $Q_2$ and $Q_3$ are the same and complementary to the control signals of the switching devices $Q_1$ and $Q_4$; x is the phase-shifting ratio between the control signal $S_1$ and the control signal $Q_1$;

inputting the control signals respectively to the control ports of the switching devices of the primary side single-phase full-bridge and the secondary single-phase full-bridge, and completing the control process.

\* \* \* \* \*